3,167,520
METHOD OF FOAMING WITH AN ALKALI METAL BOROHYDRIDE BLOWING AGENT
Robert C. Wade, Ipswich, Mass., assignor to Metal Hydrides Incorporated, Beverly, Mass., a corporation of Massachusetts
No Drawing. Filed Dec. 22, 1961, Ser. No. 161,390
12 Claims. (Cl. 260—2.5)

This invention relates to cellular articles prepared from high impact polystyrene which is a rigid thermoplastic resin prepared by blending with a copolymer of styrene and acrylonitrile not more than 40 percent by weight of a butadiene-acrylonitrile rubber.

Cellular articles have been prepared by extruding high impact polystyrene mixed with a small amount of "Celogen" which is a white crystalline powder chemically known as p,p,oxy bis (benzene sulfonyl hydrazide). The temperature used in extruding decomposed the "Celogen" to generate a gas to render the composition cellular.

The alkali metal borohydrides, such as sodium borohydride and potassium borohydride, decompose in the presence of an acidic catalyst or activator and have been used as foaming agents in the preparation of cellular articles from aqueous dispersions of natural rubber latex.

The United States patent of Robert C. Wade and Phillip L. Blanchard No. 2,951,819 describes a method for making cellular articles by mixing a solid rubber-like material, such as crude natural rubber, with a vulcanizing agent, stearic acid and an alkali metal borohydride, and then heating the mixture a a temperature between 120° C. and 180° C. until the mixture is cured. In this method the stearic acid serves as an acidic catalyst to decompose the alkali metal borohydride.

The present invention is based upon the discovery that when a finely divided high impact polystyrene resin is mixed with a small amount of an alkali metal borohydride and the mixture is extruded at a temperature sufficient to render the resin deformable, the borohydride is decomposed and a cellular article is formed. It is extremely surprising that the alkali metal borohydride is decomposed under these conditions in the absence of an added decomposition activator since the extrusion temperature is considerably below the normal decomposition temperature of the alkali metal borohydride.

The present invention, therefore, provides a thermoplastic composition having as its essential components high impact polystyrene resin and a small amount of an alkali metal borohydride, the composition being adapted to form a cellular article when extruded at a suitable extrusion temperature, that is, at a temperature not substantially greater than the temperature required to render the composition permanently deformed by the application of pressure. The amount of alkali metal borohydride used is not critical except that it should be sufficient to expand the resin to a desired extent. In general, an amount of alkali metal borohydride from about 0.01 to 0.10 part by weight for each 100 parts by weight of the resin is suitable. As the alkali metal borohydride, sodium borohydride or potassium borohydride is preferred. If desired, an inert filler, such as clay, whiting, silica, etc., may be included in the composition. The composition of the invention is useful for preparing cellular articles of any desired shape by any conventional forming techniques, such as by extrusion or by extrusion followed by vacuum forming techniques etc.

While cellular articles may be produced using the composition of the invention to which a small amount of stearic acid has been added, the resulting cellular article is less desirable for several reasons. The stearic acid introduces impurities which tend to oxidize and break down to give off odors. It increases formulation costs and can adversely affect the electrical resistance of the cellular article, especially on aging. Cellular articles formed from the composition of the invention to which stearic acid has been added are less opaque to light and have a somewhat greasy or slippery feel which does not occur if the stearic acid is omitted from the formulation. Where the product is used for making drinking cups, the greasy feel is objectionable.

The invention is illustrated further by the following example.

The following table shows the results of several extrusions wherein the resin used was high impact polystyrene. In each the resin was weighed and placed in a solids blending apparatus. Sodium borohydride or potassium borohydride as indicated in the table was weighed and added to the resin in the blender. No activator for the borohydride was used but an inert filler, when used as indicated in the table, was weighed and added to the resin in the blender. The mixture was blended for 5–15 minutes and transferred to the feed reservoir of the extrusion machine. The resin blend was extruded at the temperature indicated in the table to form a flat sheet about 28 inches wide.

| Resin in Lbs. | Borohydride in grams | Grams Inert filler | Extrusion Temperature, °F. | Density of Sheet, lbs./cu. ft. |
|---|---|---|---|---|
| 200 | 8 NaBH$_4$ | | 380-400 | 58 |
| 50 | 6 KBH$_4$ | | 400-405 | 55 |
| 50 | 4 NaBH$_4$ | 0.08 grams colloidal silica. | 405 | 45 |
| 100 | 12 NaBH$_4$ | | 405 | 45 |
| 50 | 1.25 KBH$_4$ | 23.75 clay | 400 | 60 |

The above table shows that when borohydride is used as the blowing agent an extrusion temperature as high as 405° F. can be used. The maximum extrusion temperature which can be used when "Celongen" is used as the blowing agent is 380° F. Thus, the use of borohydride as the blowing agent permits a more rapid production rate due to the higher extrusion temperature which can be used.

I claim:

1. A thermoplastic composition adapted to form a cellular article when heated to a temperature not substantially greater than the temperature required to render the composition permanently deformed by the application of pressure, said composition consisting of a high impact polystyrene and from about 0.01 to 0.10 part by weight of an alkali metal borohydride for each 100 parts by weight of the high impact polystyrene, said high impact polystyrene being a blended thermoplastic mixture consisting of (1) a copolymer of styrene and acrylonitrile and (2) a butadiene-acrylonitrile rubber, said mixture containing not more than 40 percent by weight of said butadiene-acrylonitrile rubber, said temperature being below the normal decomposition temperature of the alkali metal borohydride.

2. A composition as claimed by claim 1 wherein the alkali metal borohydride is selected from the group consisting of sodium borohydride and potassium borohydride.

3. A composition as claimed by claim 1 which also includes an inert filler.

4. A composition as claimed by claim 1 wherein the alkali metal borohydride is sodium borohydride.

5. A composition as claimed by claim 3 wherein the alkali metal borohydride is selected from the group consisting of sodium borohydride and potassium borohydride.

6. A composition as claimed by claim 3 wherein the alkali metal borohydride is sodium borohydride.

7. The method of forming a cellular article which comprises extruding at a suitable extrusion temperature a composition consisting of a high impact polystyrene and from about 0.01 to 0.10 part by weight of an alkali metal borohydride for each 100 parts by weight of the high impact polystyrene, said high impact polystyrene being a blended thermoplastic mixture consisting of (1) a copolymer of styrene and acrylonitrile and (2) a butadiene-acrylonitrile rubber, said mixture containing not more than 40 percent by weight of said butadiene-acrylonitrile rubber, said temperature being below the normal decomposition temperature of the alkali metal borohydride.

8. The method as claimed by claim 7 wherein said alkali metal borohydride is selected from the group consisting of sodium borohydride and potasisum borohydride.

9. The method as claimed by claim 7 wherein said alkali metal borohydride is sodium borohydride.

10. The method as claimed by claim 7 wherein said composition also includes an inert filler.

11. The method as claimed by claim 10 wherein said alkali metal borohydride is selected from the group consisting of sodium borohydride and potassium borohydride.

12. The method as claimed by claim 10 wherein said alkali metal borohydride is sodium borohydride.

References Cited by the Examiner
UNITED STATES PATENTS

| | | | |
|---|---|---|---|
| 2,660,194 | 11/53 | Hoffman | 260—2.5 |
| 2,758,980 | 8/56 | Talalay et al. | 260—2.5 |
| 2,909,493 | 10/59 | Bush | 260—2.5 |
| 2,930,770 | 3/60 | Wade | 260—2.5 |
| 2,951,819 | 9/60 | Wade et al. | 260—2.5 |

OTHER REFERENCES

William Gerrard: "The Organic Chemistry of Boron," Academic Press, London and New York, copyright 1961, page 132.

MURRAY TILLMAN, *Primary Examiner.*

LEON J. BERCOVITZ, *Examiner.*